United States Patent
Cheng (10) Patent No.: US 6,249,408 B1
(45) Date of Patent: Jun. 19, 2001

(54) NOTEBOOK COMPUTER AND METHOD OF CARRYING OUT DATA TRANSMISSION IN ANY DIRECTION VIA A MOBILE INFRARED SENSING DEVICE

(75) Inventor: Ted Cheng, Hsinchu (TW)

(73) Assignee: Mitac Technology Corp., Hsinchu (TW)

( * ) Notice: Subject to any disclaimer, the term of this patent is extended or adjusted under 35 U.S.C. 154(b) by 0 days.

(21) Appl. No.: 09/344,068

(22) Filed: Jun. 25, 1999

(30) Foreign Application Priority Data

Jun. 26, 1998 (TW) .................................................. 88106647

(51) Int. Cl.$^7$ ...................................................... H02H 3/00
(52) U.S. Cl. .................................. 361/1; 307/39; 307/117
(58) Field of Search .............................. 361/1, 679–681, 361/67; 307/38, 39, 116–117

(56) References Cited

U.S. PATENT DOCUMENTS 5,781,407 * 7/1998 Brauel .................................. 361/683

* cited by examiner

Primary Examiner—Michael J. Sherry
(74) Attorney, Agent, or Firm—Darby & Darby (57) ABSTRACT

A notebook computer and method of carrying out data transmission in any direction via a mobile infrared sensing device. Four connecting devices are provided at four sides (in four directions) of the computer body, respectively. Therefore, users can change the position of the infrared sensor by plugging the infrared sensor in one of the connecting devices.

14 Claims, 7 Drawing Sheets

NOTEBOOK COMPUTER AND METHOD OF CARRYING OUT DATA TRANSMISSION IN ANY DIRECTION VIA A MOBILE INFRARED SENSING DEVICE

BACKGROUND OF THE INVENTION

1. Field of the Invention

The present invention relates to a notebook computer and a method of carrying out data transmission in any direction via a mobile infrared sensing device.

2. Description of the Related Art

In general, an infrared transmission device is provided in a notebook computer for carrying out data transmission with another apparatus. The infrared sensing device (infrared sensor) of an infrared transmission device is always disposed at one side of the main body of the notebook computer. However, notebook computers made by different manufacturers may dispose their infrared sensors at different sides of the computer body. It is inconvenient for users to carefully move their computers to adequate positions and align their infrared transmission devices in a specific direction before data transmission with another apparatus.

Consequently, it would be helpful for users to be able to adjust the position of an infrared sensing device disposed in a notebook computer according to the direction of data transmission. Users can carry out data transmission without additional movement and alignment of the notebook computer and another apparatus.

SUMMARY OF THE INVENTION

Therefore, an object of the present invention is to provide a method of carrying data transmission in any direction for a notebook computer.

Another object of the present invention is to develop a notebook computer capable of adjusting the position of an infrared sensor. Four connecting devices are provided at four sides of the computer body respectively. Therefore, users can change the position of the infrared sensor by plugging the infrared sensor in one of the four connecting devices.

A further object of the present invention is to provide an infrared-sensor selecting apparatus for automatically detecting a corresponding device connected to an infrared sensor and activating the corresponding device. The infrared-sensor selecting apparatus is applied to a notebook computer for achieving a notebook computer capable of adjusting the position of an infrared sensor.

The present invention achieves the above-indicated objects by providing a method of carrying out data transmission in any direction via an infrared sensing device for a notebook computer.

The method comprises: providing a plurality of detecting in a notebook computer; providing a plurality of connecting devices at four sides of the notebook computer and electrically connected to the detecting devices, respectively; and providing a mobile infrared sensing device, selectively and electrically connected to any one of the connecting devices according to the changes in direction of data transmissions. After the mobile infrared sensing device is selectively coupled to one of the connecting devices, one of the detecting devices coupled thereto is activated for data transmission and the other detecting devices are disabled.

The present invention further achieves the above-indicated objects by providing a notebook computer capable of adjusting the position of an infrared sensing device disposed therein according to the direction of data transmissions.

The notebook computer comprises at least: a main body; an infrared sensing device; four detecting devices; and four connecting devices provided at four sides of the main body and electrically connected to the four detecting devices, respectively; wherein the infrared sensing device is selectively connected to one of the connecting devices according to the desired direction of data transmissions, and a selection-control signal is strobed for activating the detecting device coupled to the connecting device and used to disable the other detecting devices, thereby carrying out data transmissions via the infrared sensing device in conjunction with the activated detecting device.

The present invention further achieves the above-indicated objects by providing an infrared-sensor selecting apparatus for automatically detecting an infrared sensor coupled to one of a plurality of detecting devices and activating the detecting device.

The infrared-sensor selecting apparatus comprises:

an infrared sensor; a plurality of detecting devices; a plurality of connecting devices provided at different predetermined positions and electrically connected to the detecting devices, respectively; wherein, after the infrared sensor is selectively coupled to one of the connecting devices, a selection-control signal is strobed for activating the detecting device coupled to the connecting device, and the other detecting devices are disabled.

BRIEF DESCRIPTION OF THE DRAWINGS

The following detailed description, given by way of example and not intended to limit the invention solely to the embodiments described herein, will best be understood in conjunction with the accompanying drawings, in which.

DETAILED DESCRIPTION OF THE PREFERRED EMBODIMENTS

Figure 1:
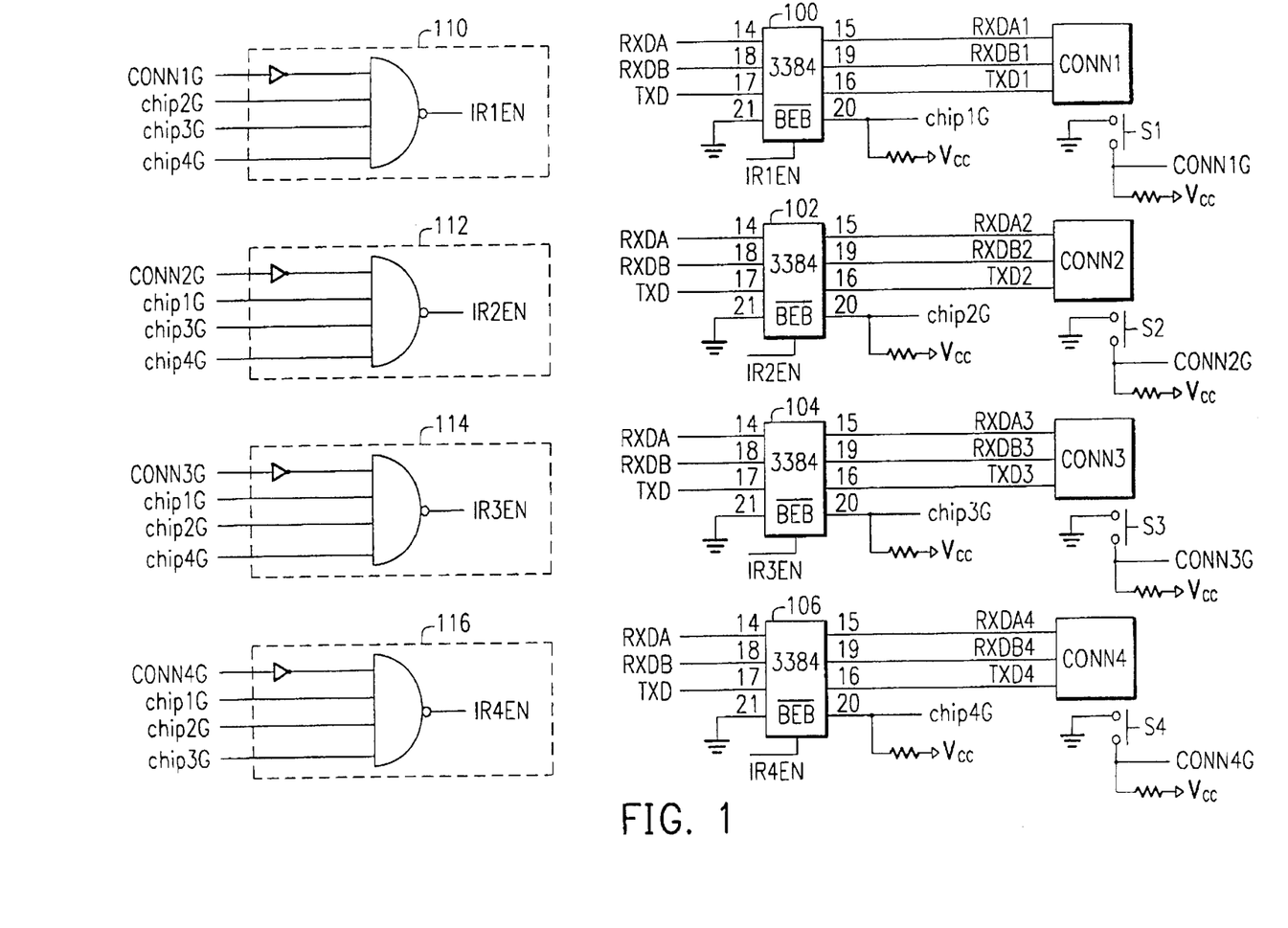
FIG. 1 schematically illustrates the circuit diagram of one embodiment of the infrared-sensor selecting apparatus in a notebook computer capable of changing the position of an infrared sensing device.
Figure 2:
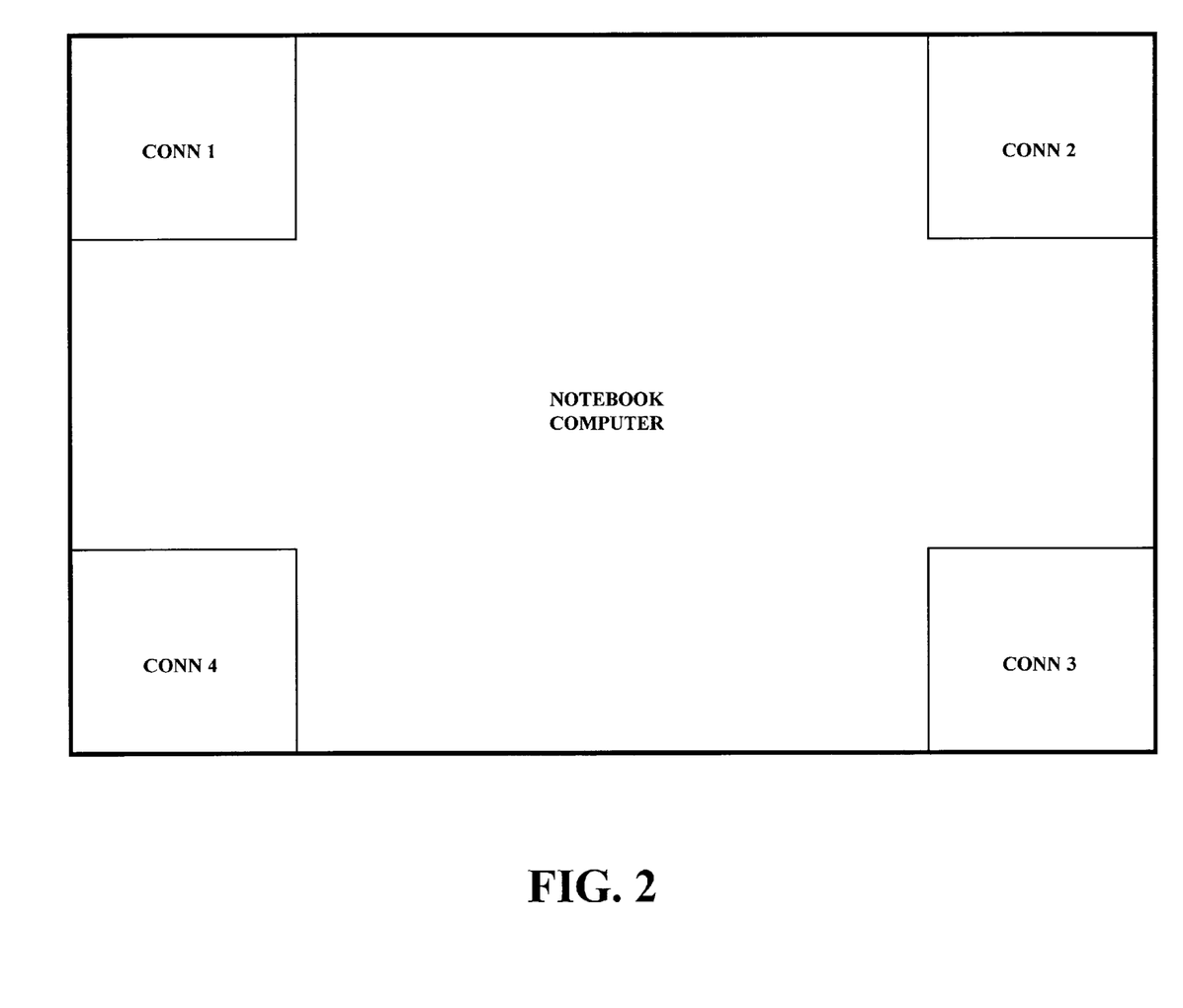
FIG. 2, FIG. 3, FIG. 4, FIG. 5, FIG. 6 and FIG. 7 are top plan views (not drawn to scale) of a notebook computer showing exemplary (but by no means exhaustive) locations of the four connecting devices CONN1, CONN2, CONN3 and CONN4 for infrared transmission.
Figure 3:
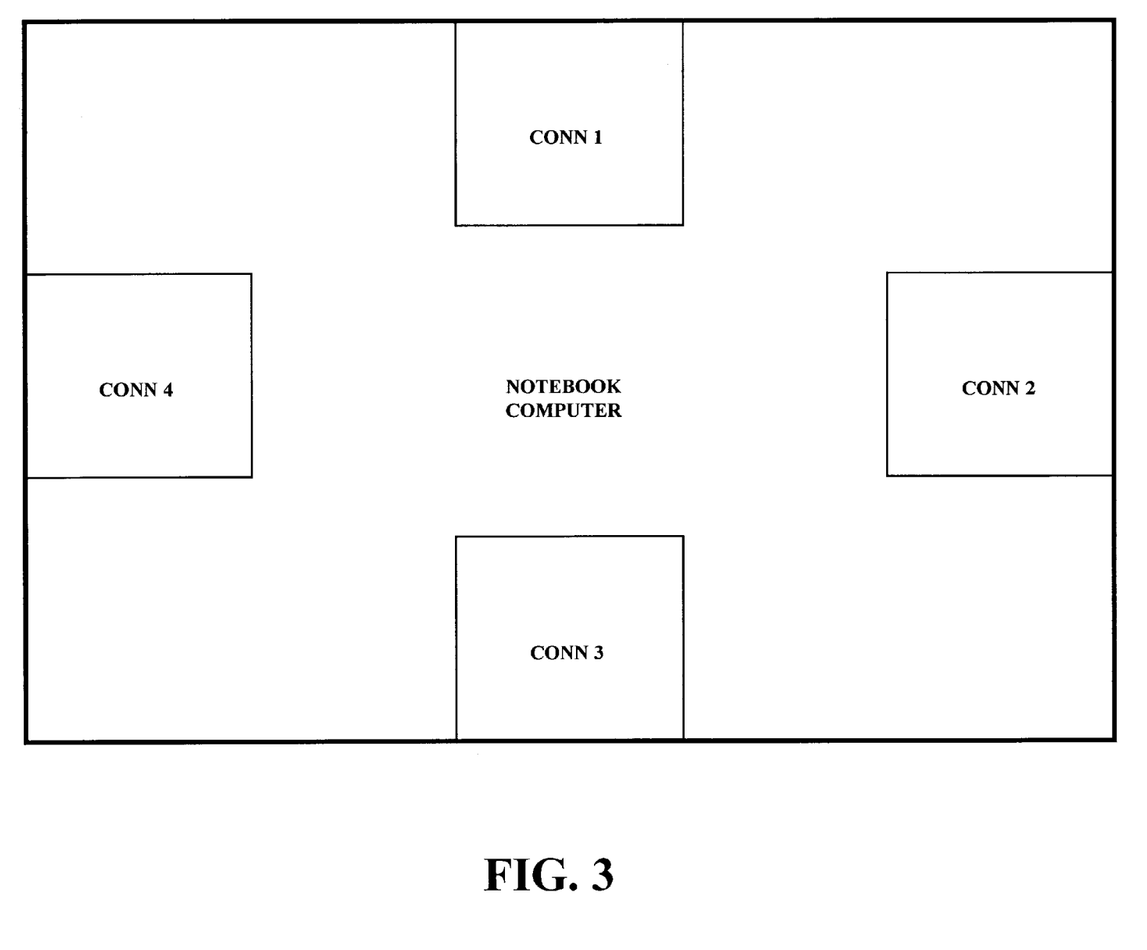
Figure 4:
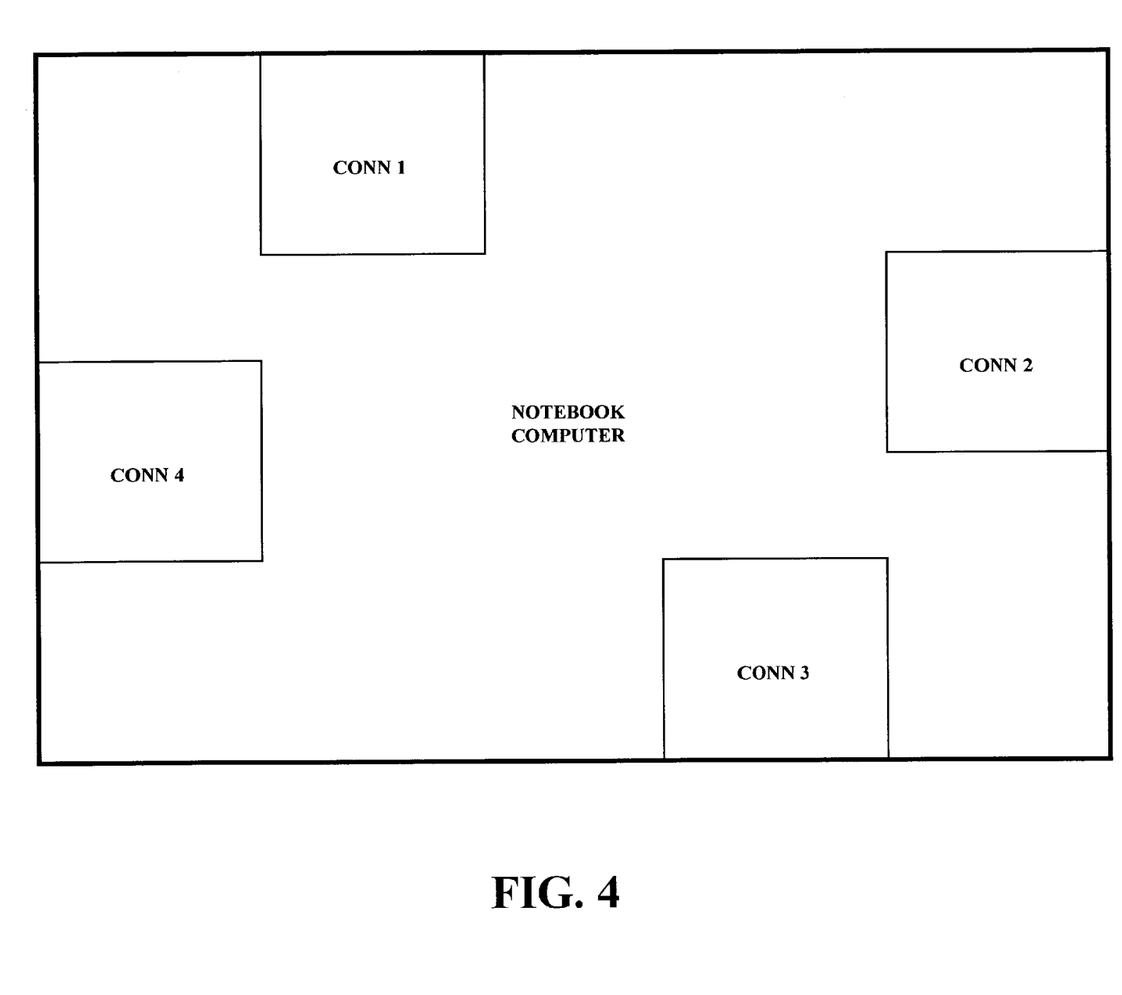
Figure 5:
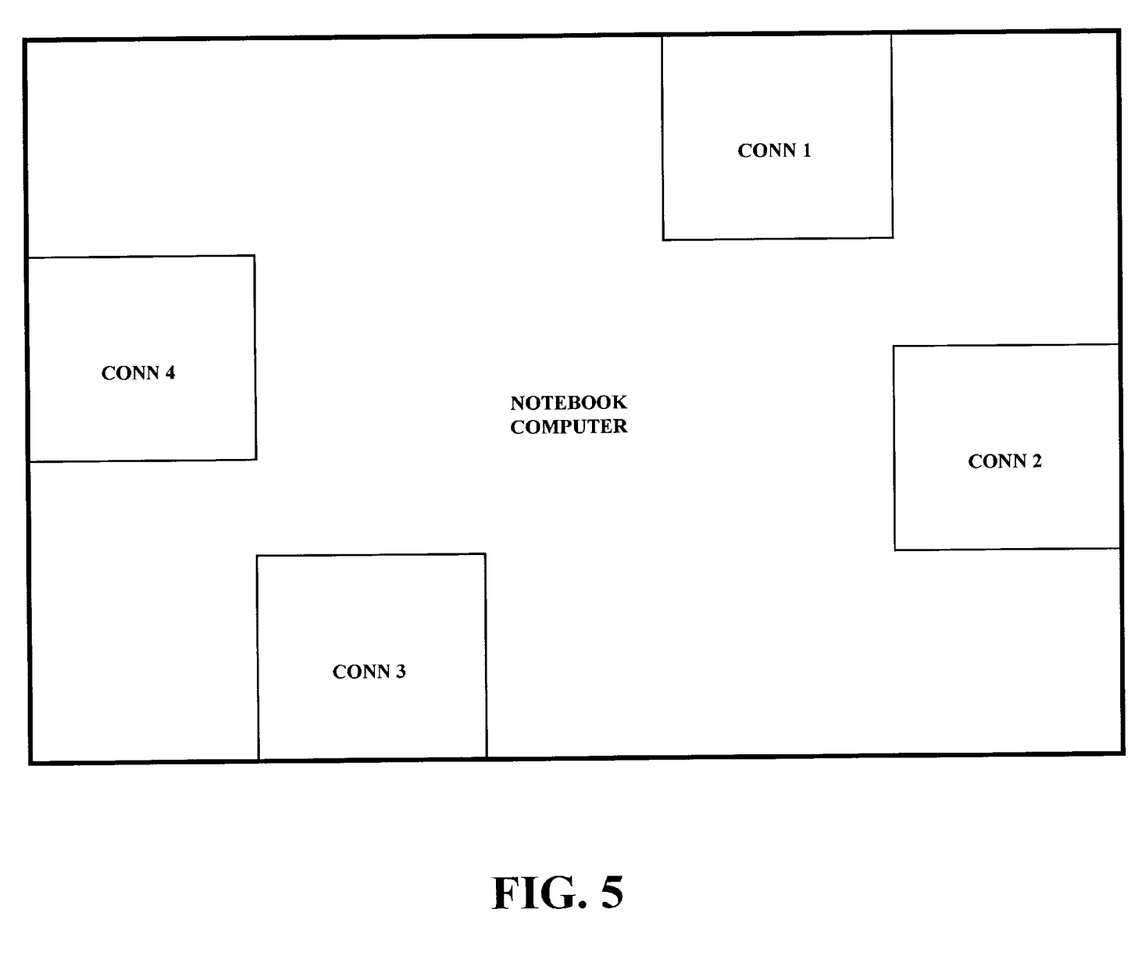
Figure 6:
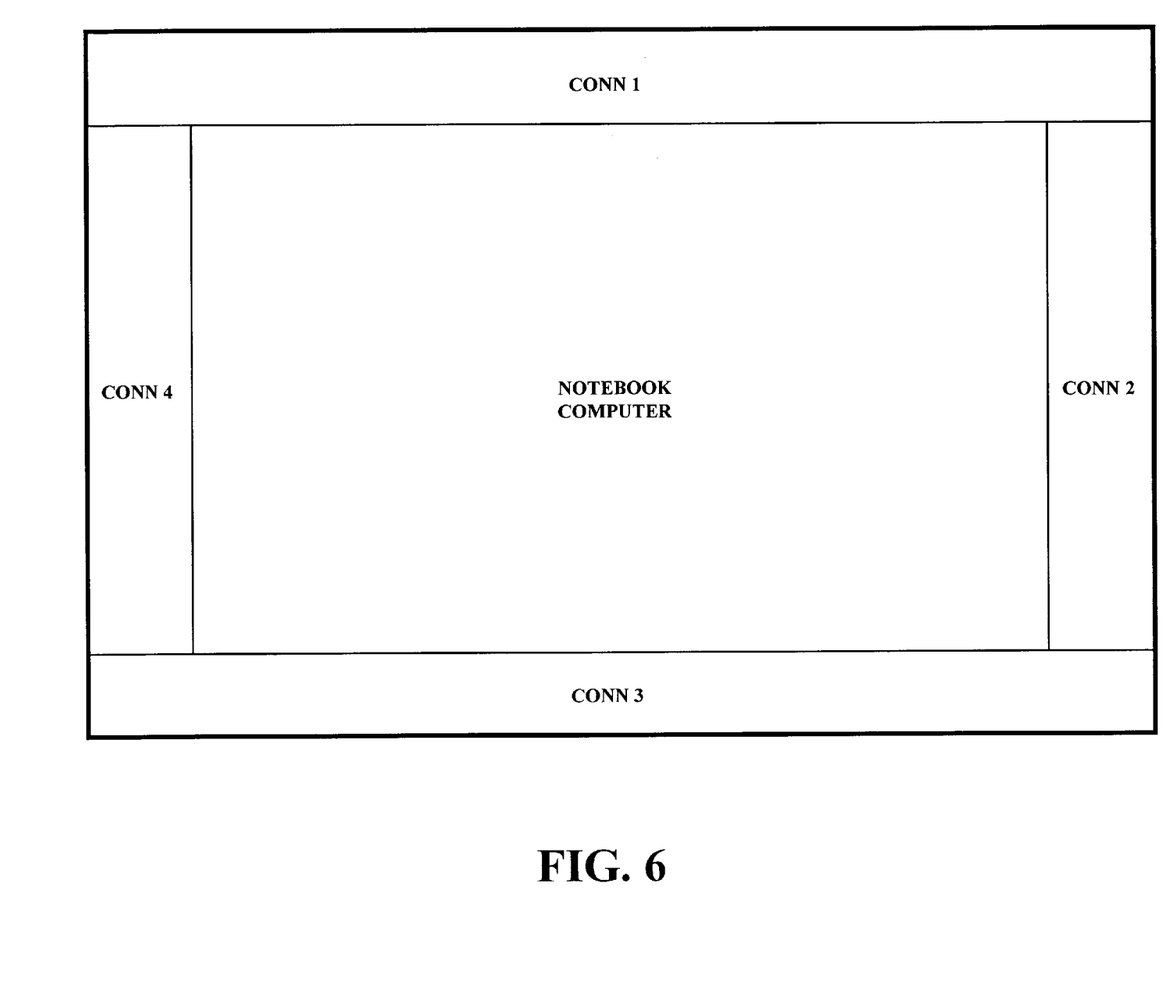
Figure 7:
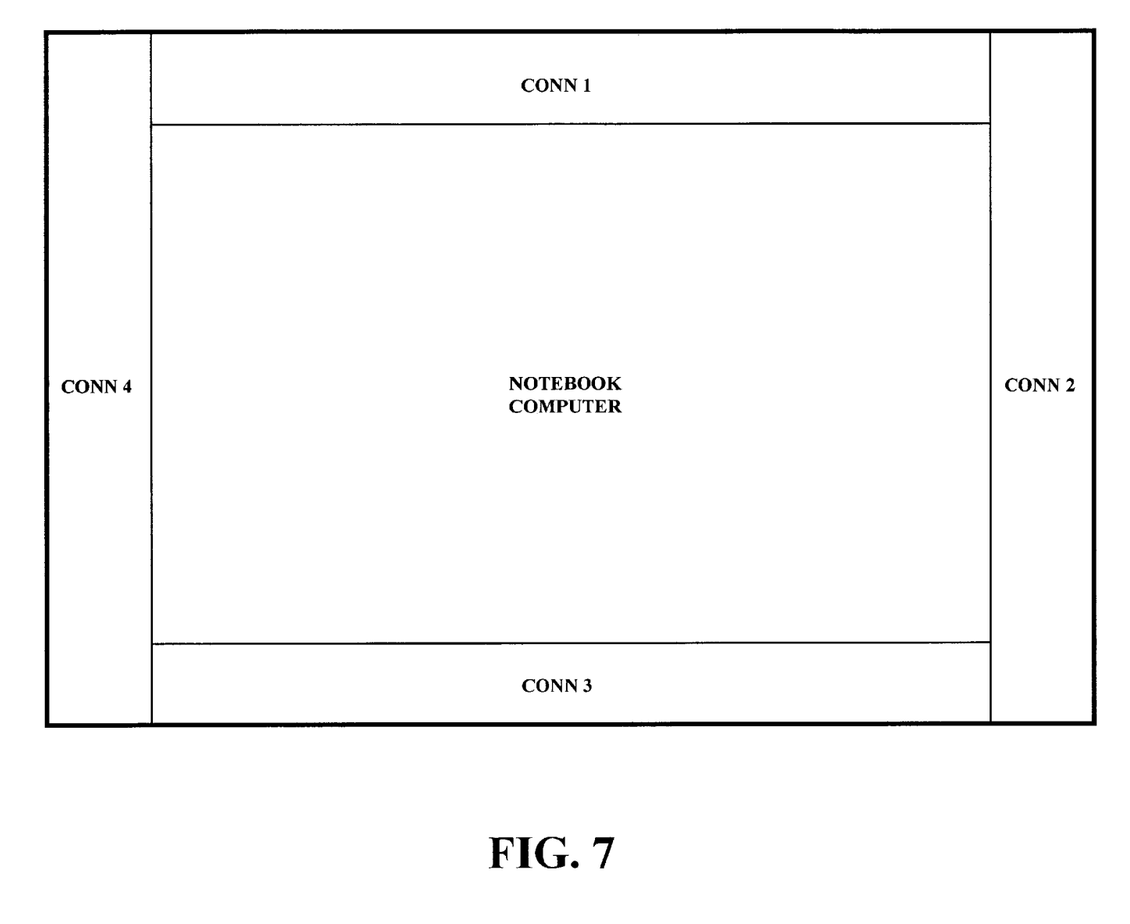

Referring to FIG. 1, a circuit diagram of an infrared-sensor selecting apparatus according to the present invention is shown. The infrared-sensor selecting apparatus comprises an infrared sensor (not shown in FIG. 1); a plurality of connecting devices which can be disposed at different predetermined positions; and a plurality of detecting devices connected to the connecting devices respectively. For brevity, four connecting devices (CONN1~CONN4) and four detecting devices are depicted in FIG. 1 as an example in this embodiment.

Every one of the detecting devices comprises a selecting device (110~116); and a transmission-control device (100~106). In this embodiment, the transmission-control devices are integrated circuits coded 3384 (IC3384) and the numerals attached beside each IC3384 represents their pin number. Every one of the selecting devices (110~116) is a combinational logic circuit consisting of a 4-input NAND gate and a NOT gate.

If infrared sensing device is electrically connected to the connecting device CONN1 (CONN2, CONN3, or CONN4), then switch S1 (S2, S3, or S4) is turned on, thereby changing the selection-control signal CONN1G from a high voltage level "H" to a low voltage level "L", wherein CONN2G, CONN3G, and CONN4G are still at high voltage levels. Before the transmission-control devices (100~106) are activated, signals chip1G~chip4G are at high voltage levels. Therefore, only the selecting device 110 outputs enable signal IR1EN with a low voltage level "L".

The enable signal IR1EN is inputted to the enable terminal ($\overline{BEB}$) and activates the transmission-control device 100 (IC3384). Therefore, data can be transmitted through the transmission control device 100.

After activating the transmission-control device 100, the voltage level of the disable signal chip1G at the $20^{th}$ pin of the IC3384 (100) changes from a high voltage level "H" to a low voltage level "L". Therefore, the outputs of the selecting devices (IR2EN, IR3EN, and IR4EN) are still at high voltage levels, and the other transmission-control devices (102~106) are not activated. Even though users plug two infrared sensing devices to two connecting devices, only the transmission-control device connected with the first plugged infrared sensing device can be activated.

If infrared sensing devices is electrically connected to one of the other connecting devices CONN2 (CONN3, OR CONN4), then switch S2 (S3, or S4) is turned on, thereby changing the selection-control signal CONN2G (CONN3G, or CONN4G) from a high voltage level "H" to low voltage level "L". The following operations are similar with the above descriptions, and not described again. Moreover, the transmission terminals (RXDA, RXDB, and TXD) of each of the transmission-control devices (IC3384) are coupled to the same data processing data device in this embodiment. However, they also can be coupled to different data processing devices, respectively.

In order to make a notebook computer be able to transmit data in any direction, the present invention discloses a method comprising: providing four detecting devices in a notebook computer; providing four connecting devices at four sides of the notebook computer and electrically connected to the detecting devices, respectively; and, providing a mobile infrared sensing device, selectively and electrically connected to any one of the connecting devices according to the changes in direction of data transmissions.

After the mobile infrared sensing device is selectively coupled to one of the connecting devices, the corresponding detecting device coupled to the infrared sensing device is activated for data transmission and the other detecting devices are disabled; thereby data transmission can be carried out. Users can change the position of the infrared sensing device according to the desired direction of data transmission by simply plugging the infrared sensing device in the right position and do not have to carefully move and align the notebook computer with another apparatus before data transmission.

Based on the method described above, the present invention discloses a notebook computer which provides four connecting devices (CONN1~CONN4) at four sides of its main body and electrically connected to four detecting devices, respectively.

FIG. 2, FIG. 3, FIG. 4, FIG. 5, FIG. 6 and FIG. 7 are top plan views (not drawn to scale) of a notebook computer showing exemplary (but by no means exhaustive) locations of the four connecting devices CONN1, CONN2, CONN3 and CONN4 for infrared transmission.

The infrared sensing device can be selectively connected to one of the connecting devices according to the desired direction of data transmission, and a selection-control signal (IR1EN, IR2EN, IR3EN, or IR4EN) is stored for activating one of the transmission-control devices (100~106), and the other detecting devices are disabled. The principles and operations are the same as those of the infrared-sensor selecting apparatus, and therefore not described again.

The connecting devices (CONN1~CONN4) can be connecting sockets. The infrared sensing device can be a unit with a plug. The infrared sensing device is selectively connected to any one of the detecting devices by inserting the plug of the infrared sensing device in the corresponding connecting sockets. Therefore, it is very convenient for users to remove the infrared sensing device from one connecting device and plug it into another connecting device.

While the invention has been described by way of example and in terms of the preferred embodiment, it is to be understood that the invention is not limited to the disclosed embodiment. On the contrary, it is intended to cover various modifications and similar arrangements as would be apparent to those skilled in the art. Therefore, the scope of the appended claims should be accorded the broadest interpretation so as to encompass all such modifications and similar arrangements.

What is claimed is:

1. A notebook computer, capable of adjusting a position of an infrared sensing device disposed therein according to a direction of data transmission, comprising at least:
   a main body;
   an infrared sensing device;
   four detecting devices;
   four connecting devices provided at four sides of said main body and electrically connected to said four detecting devices;
   wherein said infrared sensing device is selectively connected to one of said connecting devices according to a desired direction of data transmission, and a selection-control signal is strobed for activating a detecting device coupled to said one connecting device and used to disable other detecting devices, thereby carrying out data transmissions via said infrared sensing device in conjunction with said activated detecting device.

2. The notebook computer as claimed in claim 1, wherein each of said detecting devices comprises a selecting device and a transmission-control device.

3. The notebook computer as claimed in claim 2, wherein said selecting device outputs an enable signal for activating said transmission-control device in response to said selection-control signal, thereby starting data transmission via said transmission-control device.

4. The notebook computer as claimed in claim 2, wherein said transmission-control device outputs a disable signal for disabling a selecting device.

5. The notebook computer as claimed in claim 1, wherein said connecting devices are connecting sockets and said infrared sensing device is a unit with a plug; wherein said infrared sensing device is selectively coupled to one of said detecting devices by inserting the plug of said infrared sensing device in a corresponding connecting socket.

6. A infrared-sensor selecting apparatus for automatically detecting an infrared sensor coupled to one of a plurality of detecting devices and for activating a detecting device, comprising:
   an infrared sensor;
   a plurality of detecting devices;
   a plurality of connecting devices provided at different predetermined positions and electrically connected to said detecting devices;

wherein, after said infrared sensor is selectively coupled to one of said connecting devices, a selection-control signal is strobed for activating a detecting device coupled to said one connecting device while other detecting devices are disabled.

7. The infrared-sensor selecting apparatus as claimed in claim 6, wherein each of said detecting devices comprises a selecting device and a transmission-control device.

8. The infrared-sensor selecting apparatus as claimed in claim 7, wherein said selecting device outputs an enable signal for activating said transmission-control device in response to said selection-control signal, thereby starting data transmission via said transmission-control device.

9. The infrared-sensor selecting apparatus as claimed in claim 7, wherein said transmission-control device outputs a disable signal for disabling a selecting device.

10. The infrared-sensor selecting apparatus as claimed in claim 6, wherein said detecting devices are electrically coupled to at least one data processing device.

11. The infrared-sensor selecting apparatus as claimed in claim 6, wherein said connecting devices are connecting sockets and said infrared sensor is a unit with a plug; wherein said infrared sensor is selectively coupled to one of said detecting devices by inserting the plug of said infrared sensor in a corresponding connecting socket.

12. A method of carrying out data transmission in any direction via an infrared sensing device for a notebook computer, comprising:

providing a plurality of detecting devices in a notebook computer;

providing a plurality of connecting devices at four sides of said notebook computer and electrically connected to said detecting devices;

providing a mobile infrared sensing device, selectively and electrically connected to one of said connecting devices according to changes in direction of data transmission;

wherein, after said mobile infrared sensing device is selectively coupled to one of said connecting devices, the detecting device coupled thereto is activated for data transmission while other detecting devices are disabled.

13. The method as claimed in claim 12, wherein, before said mobile infrared sensing device is electrically connected to any one of said connecting devices, all of said detecting devices are disabled.

14. The method as claimed in claim 12, wherein said connecting devices are connecting sockets, and said mobile infrared sensing device is a unit with a plug and selectively electrically coupled to one of said detecting devices by inserting the plug of said infrared sensing device in a corresponding connecting socket.

* * * * *